(12) United States Patent
Morard et al.

(10) Patent No.: US 12,198,349 B2
(45) Date of Patent: Jan. 14, 2025

(54) METHODS AND SYSTEMS FOR REAL-TIME IMAGE 3D SEGMENTATION REGULARIZATION

(71) Applicant: GE Precision Healthcare LLC, Waukesha, WI (US)

(72) Inventors: Vincent Morard, Yvelines (FR); Nicolas Gogin, Yvelines (FR); Adele Courot, Yvelines (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 332 days.

(21) Appl. No.: 17/648,911

(22) Filed: Jan. 25, 2022

(65) Prior Publication Data

US 2023/0237663 A1  Jul. 27, 2023

(51) Int. Cl.
*G06T 7/11* (2017.01)
*G06F 3/04845* (2022.01)
(Continued)

(52) U.S. Cl.
CPC ............ *G06T 7/11* (2017.01); *G06F 3/04845* (2013.01); *G06T 5/20* (2013.01); *G06T 5/70* (2024.01); *G06T 7/136* (2017.01); *G06T 7/143* (2017.01); *G06T 2200/04* (2013.01); *G06T 2200/24* (2013.01); *G06T 2207/10081* (2013.01);
(Continued)

(58) Field of Classification Search
CPC ..... G06T 7/11; G06T 5/20; G06T 5/70; G06T 7/136; G06T 7/143; G06T 2200/04; G06T 2200/24; G06T 2207/10081; G06T 2207/20076; G06T 2207/20081; G06T 2207/20084; G06T 2207/20104; G06T 2207/30004; G06T 2207/10116; G06T 7/0012; G06T 7/62; G06T 2207/10012; G06T 2207/30036; G06T 2207/30101; G06F 3/04845; G06V 10/25; G06V 10/774; G06V 10/82

See application file for complete search history.

(56) References Cited

U.S. PATENT DOCUMENTS 11,049,289 B2    6/2021  Morard et al.
2009/0136096 A1  5/2009  Sirohey et al.
(Continued)

FOREIGN PATENT DOCUMENTS

EP    3441944 A1    2/2019

OTHER PUBLICATIONS

"Segmentation smoothing brush—new segmentation tool in 3D Slicer," YouTube Website, Available Online at https://www.youtube.com/watch?v=rjNcvefBaNU, Nov. 12, 2020, 4 pages.
(Continued)

*Primary Examiner* — Md K Talukder
(74) *Attorney, Agent, or Firm* — McCoy Russell LLP (57) ABSTRACT

Various methods and systems are provided for real-time image segmentation of medical image data. In one example, the real-time image segmentation of the medical image data may include updating an initial segmentation of the medical image data in real-time. The update may be based on a user input to a regularization brush applied to the medical image data, the user input to the regularization brush allowing modification of a volume of the initial segmentation.

14 Claims, 7 Drawing Sheets

(51) Int. Cl.
  *G06T 5/20* (2006.01)
  *G06T 5/70* (2024.01)
  *G06T 7/136* (2017.01)
  *G06T 7/143* (2017.01)

(52) U.S. Cl.
  CPC ............ *G06T 2207/20076* (2013.01); *G06T 2207/20081* (2013.01); *G06T 2207/20084* (2013.01); *G06T 2207/20104* (2013.01); *G06T 2207/30004* (2013.01)

(56) References Cited

U.S. PATENT DOCUMENTS

| | | | |
|---|---|---|---|
| 2013/0257853 A1 | 10/2013 | Schmidt | |
| 2017/0270664 A1* | 9/2017 | Hoogi | A61B 6/5217 |
| 2020/0085382 A1* | 3/2020 | Taerum | G06T 7/0016 |
| 2020/0380675 A1* | 12/2020 | Golden | G06T 7/143 |
| 2021/0110533 A1* | 4/2021 | Viti | G06T 7/0012 |
| 2023/0237663 A1* | 7/2023 | Morard | G06T 7/136 |
| | | | 382/128 |

OTHER PUBLICATIONS

Akal Orhan: "Deep Learning Based Generalization of Chan-Vese Level Sets Segmentation", 2020, XP093053256, [retrieved on Jun. 9, 2023].

EP application 23150538.9 filed Jan. 6, 2023—extended Search Report issued Jun. 20, 2023; 10 pages.

Neil Birkbeck et al: "An interactive graph cut method for brain tumor segmentation", Applications of Computer Vision (WACV), 2009 Workshop on, IEEE, Piscataway, NJ, USA, Dec. 7, 2009 (Dec. 7, 2009), pp. 1-7, XP031622283, ISBN: 978-1-4244-5497-6.

Samuel Silva et al: "A 3D Tool for Left Ventricle Segmentation Editing", Jun. 21, 2010 (Jun. 21, 2010), Image Analysis and Recognition, Springer Berlin Heidelberg, Berlin, Heidelberg, pp. 79-88, XP019144904, ISBN: 978-3-642-13774-7.

T.F Chan et al: "Active contours without edges", IEEE Transactions on Image Processing, Jan. 2001 (Jan. 2001), pp. 266-277, XP055292958, New York DOI: 10.1109/83.902291 Retrieved from the Internet: URL:http://cdanup.com/10.1.1.2.1828.pdf.

* cited by examiner

METHODS AND SYSTEMS FOR REAL-TIME IMAGE 3D SEGMENTATION REGULARIZATION

FIELD

Embodiments of the subject matter disclosed herein relate to image segmentation, and more particularly to 3D image segmentation regularization of medical image data in real-time.

BACKGROUND

Clinical decisions may be derived from an analysis of a set or sets within data sources. In the radiology domain, this may typically involve analysis of regions of interest from medical image data, which may include 2D or 3D medical images, such as images of organs (kidney, liver, spleen, etc.), blood vessels, bones, and the like. Medical image analysis may be performed at the request of a referring physician for a specific purpose; this purpose may include detection, assessment, and/or monitoring the progression of anatomical abnormalities like lesions, aneurysms, atrophies, and so on.

In order to access these regions of interest of the medical image data and perform the desired analysis, data corresponding to these regions may first be accurately and robustly separated from other data. While many context specific algorithms exist to segment regions of interest within medical image data, such as organs, such algorithms may produce inaccurate results for other anatomical features or pathological structures like lesions and nodules, due to the variability in many sources of medical data. Moreover, factors such as scale, noise, motion, partial voluming, and other artifacts within medical image data may hamper the accuracy and precision of segmentation algorithms.

BRIEF DESCRIPTION

In one embodiment, a method for real-time segmentation regularization of medical data comprises: updating an initial segmentation of the medical image data in real-time based on a user input to a regularization brush applied to the medical image data, the user input to the regularization brush allowing modification of a volume of the initial segmentation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The present disclosure will be better understood from reading the following description of non-limiting embodiments, with reference to the attached drawings, wherein below.

DETAILED DESCRIPTION

The following description relates to various embodiments for systems and methods for image segmentation of medical image data in real-time. Image segmentation may include partitioning a digital image into distinct components (in other words, partitioning the digital image into image segments, with each image segment being a collection of pixels), and may be utilized in order to simplify and/or change the representation of an image into something that is more meaningful and easier analyze (e.g., by a referring physician). During analysis of medical image data, which may be in 2D or in 3D, it may be useful to apply segmentation to the medical image data in order to allow for easy characterization of certain anatomical features (e.g., organs, blood vessels, bones, etc.) by a referring physician for diagnosis, analysis, and the like. In some examples, image segmentation may be done in an automated manner, based on the medical image data and the feature desired to be segmented, via e.g., a machine learning algorithm. In other examples, segmentation may be accomplished via an image analysis algorithm, in conjunction with user interaction with the medical image data.

One example of the latter type of segmentation (e.g., including user input along with algorithmic modification of the segmentation) is through a user interface tool, such as an edge aware brush tool. An edge aware brush tool may utilize the medical image data in order to identify boundaries within the medical image data, and allow a user (e.g., a radiologist) to make changes interactively and in real-time to the segmentation. Changes to the segmentation may be implemented by the user viewing the segmentation overlaid over the medical image, via the edge aware brush, which is a user interface tool which allows the user to edit the segmentation within a sphere (in 3D, or a circle in 2D) around the cursor, allowing the user to expand or reduce the segmentation within the sphere/circle. The expansion/reduction of the segmentation within the sphere of the edge aware brush may be sensitive to boundaries, such that crossing of boundaries within the medical image, as determined by an image processing algorithm operating on the medical image, may be restricted. However, in the case of medical image data that is noisy, such as including unwanted image gradients, image artifacts which may lead to misleading image boundaries, etc., this may mislead a user interactive tool which relies solely on the medical image data, such as the edge aware brush. Therefore, a user interactive tool which may facilitate fast editing by the user, but may allow for flexibility to deal with noisy features within the medical image data as desirable.

A regularization brush may allow user interaction with the medical image data in order to provide a segmentation mask to the medical image data. Application of the regularization brush by the referring physician may take as input user inputs (such as a position of a cursor pointer (e.g., as determined by a mouse) on the medical image data, a radius of a sphere of the cursor pointer, and an option to expand/reduce/keep same the radius of the sphere), in addition to the current segmentation, in order to update the segmentation based on the user inputs, via generation of a new segmentation mask. Generation of the new segmentation mask based on the current segmentation and user inputs may include pre-processing of the current segmentation (including adaptive resampling of the segmentation based on the user input from the regularization brush), and calculating a probability map on the segmentation mask, the probability map indicating a probability that a new segmentation generated is the desired segmentation, in addition to thresholding (to be explained in more detail in relation to FIG. 2), which may generate a binary mask to be used to update the segmentation. In some examples, the probability map may be generated based on applying a lower pass filter on the current segmentation mask (e.g., mean filter, a Gaussian filter, anisotropic filter, and so on). In other examples, the probability map may be calculated based on machine learning techniques. The updating of the segmentation as described above may then be continually iterated in real-time, in response to the user input.

In this way, by applying real-time image segmentation of medical data based on user input from the regularization brush, and by including the machine learning algorithm to adapt the segmentation mask to the medical image data, referring physicians may interact with the image segmentation in real-time in an intuitive manner, and inter/intra-variability among users may be reduced. The technical effect of updating the segmentation based on the initial segmentation and user inputs is that noisy features (e.g., image noise, image artifacts such as beam hardening and scattering, and features such as tumors and legions) in the medical image data may not confound the segmentation by the regularization brush, allowing for easy manipulation of the segmentation by the referring physician, as compared to e.g., an edge aware brush. By having the regularization operate based on input from the segmentation and user input, local smoothing and localization of the boundary of the segmentation may be more easily achieved by the referring physician.

Figure 1:
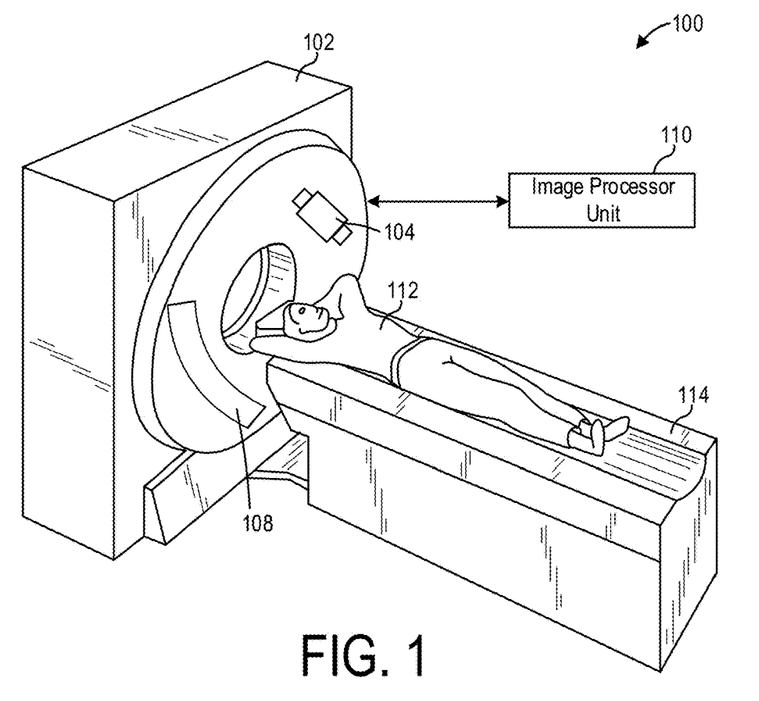
FIG. 1 shows a pictorial view of an imaging system, according to an embodiment.
Figure 2:
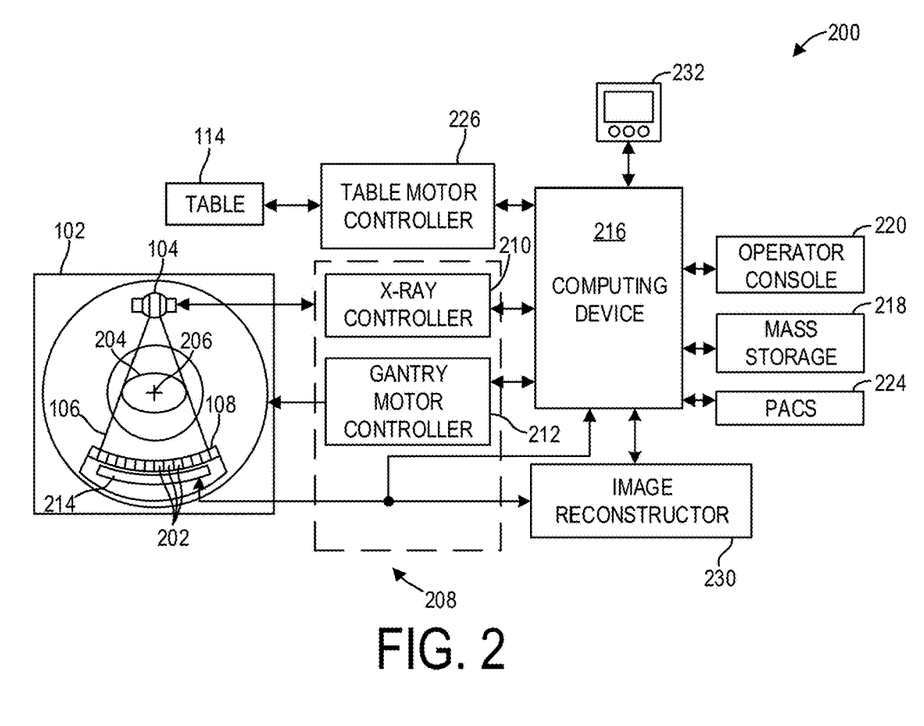
FIG. 2 shows a block schematic diagram of an exemplary imaging system, according to an embodiment.
Figure 5:
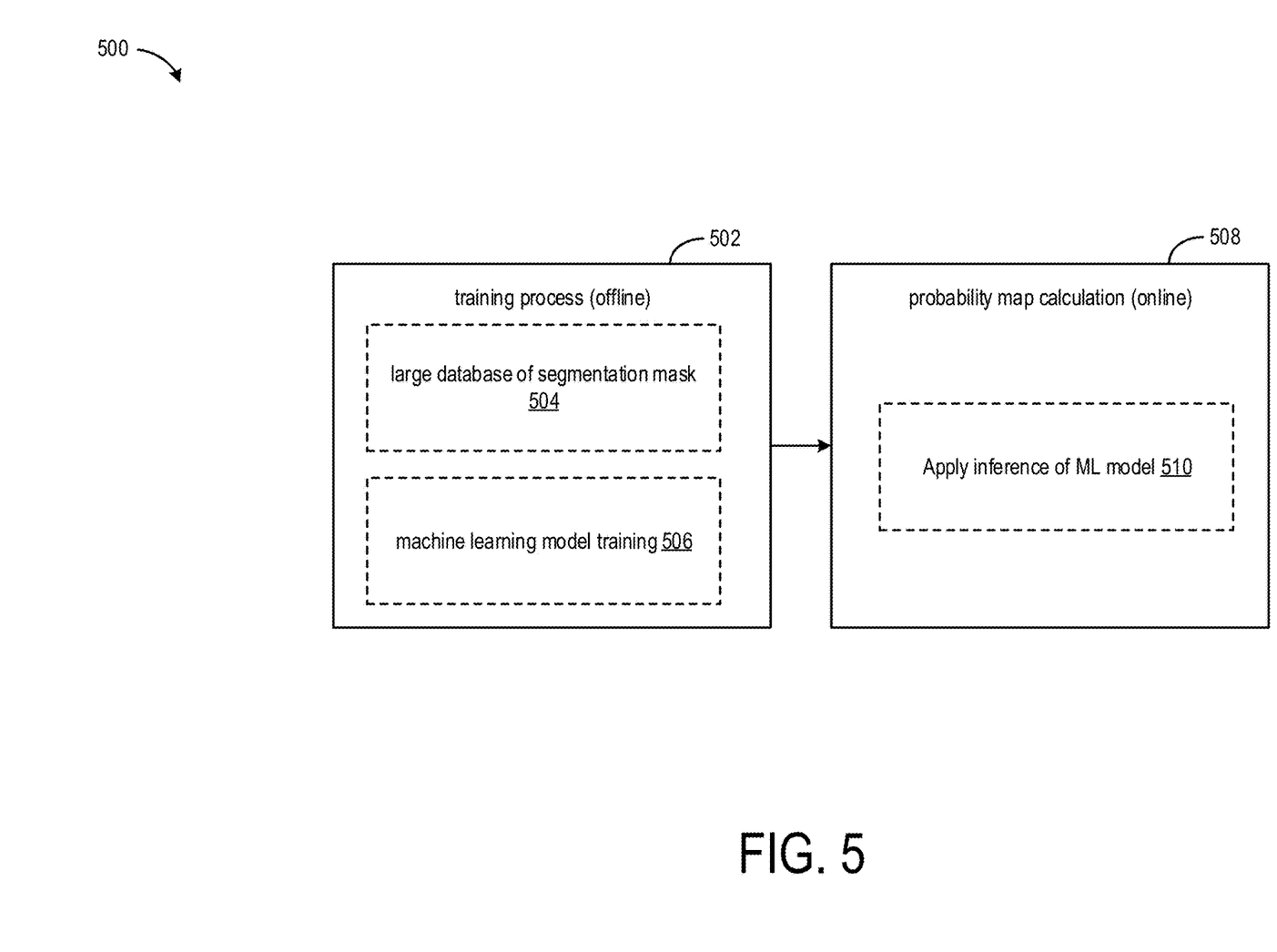
FIG. 5 shows an example method for utilizing a machine learning model in order to calculate a probability map for the image segmentation.
Figure 6:
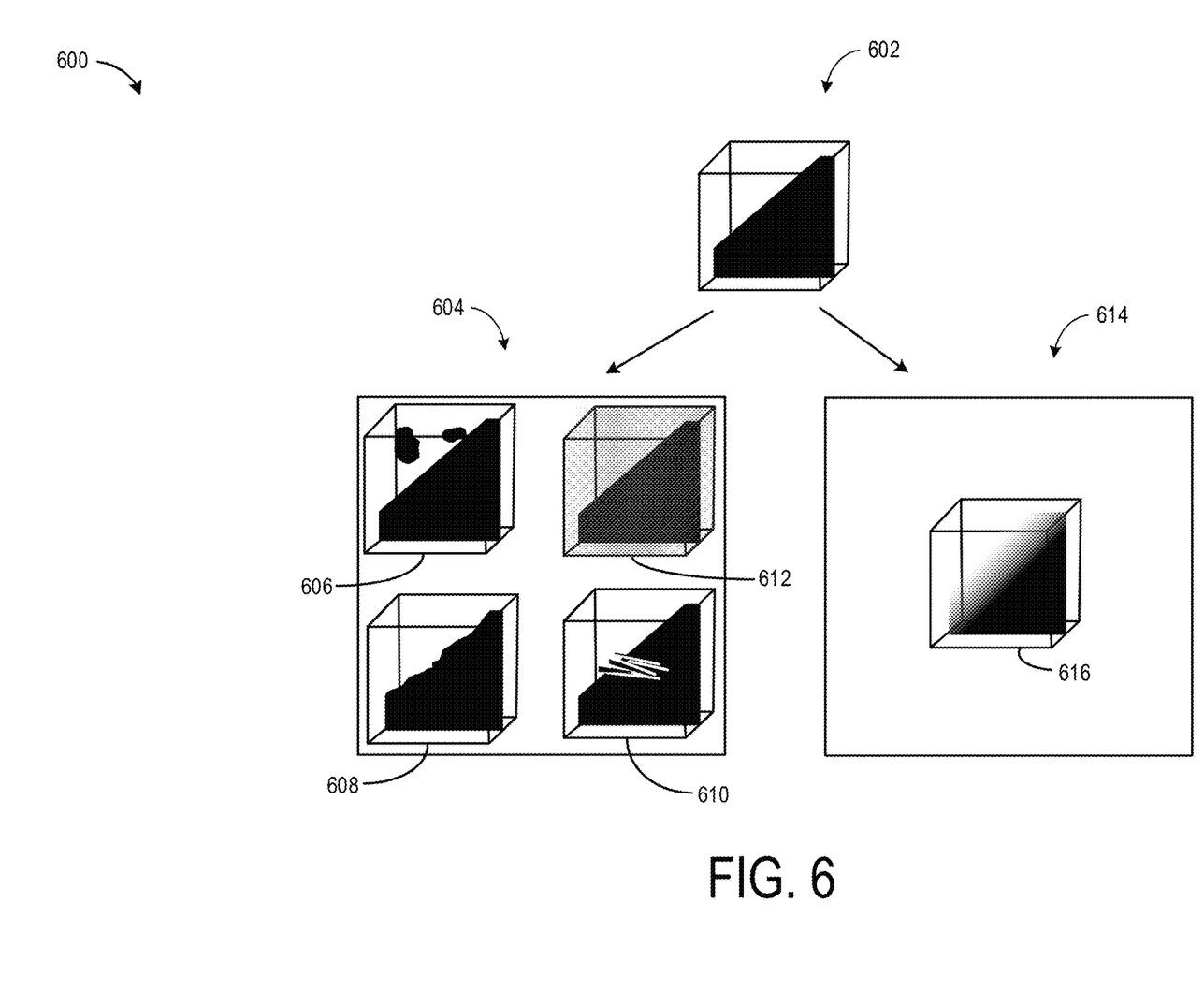
FIG. 6 shows an example operation of the machine learning model of FIG. 5 generating sample training data used to train the machine learning model, in addition to a generating a ground truth segmentation from a binary mask of an organ that represents an output of the machine learning model.
Figure 7:
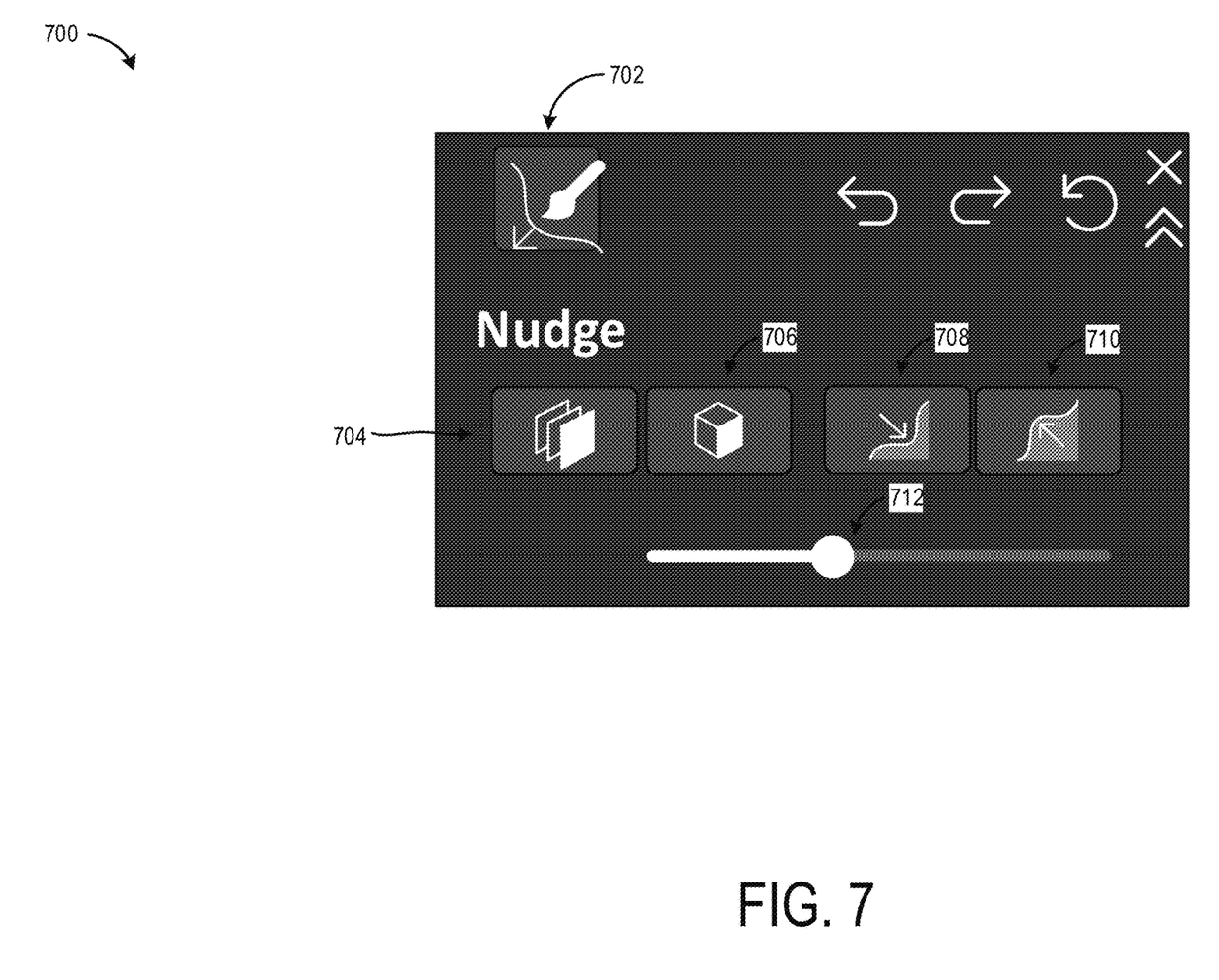
FIG. 7 shows an example user interface for image segmentation.
Figure 8:
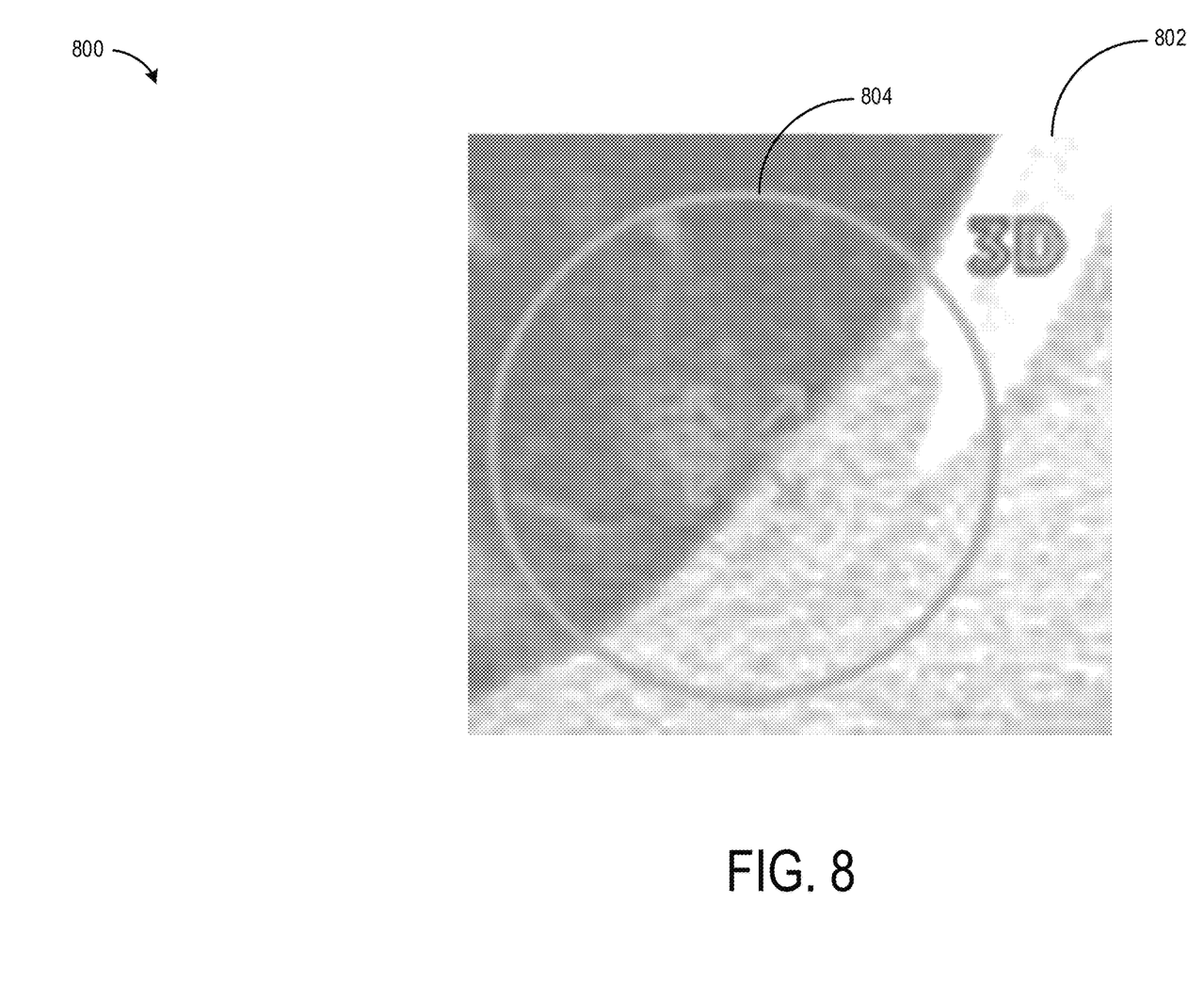
FIG. 8 shows an example erroneous segmentation of an image of a lung, including a regularization brush applicable by a user for correcting the image segmentation.

The medical images to be examined may be radiological images for example, and may be generated by a single or multiple imaging modalities, including X-ray, ultrasound, MRI, and so on. Image segmentation based on user input may then be enacted on the medical image data. An example imaging system may be a computerized tomography (CT) system 100, as illustrated in FIG. 1. FIG. 2 illustrates a second exemplary imaging system 200 similar to the CT system 100 of FIG. 2. 3D medical image data received from an example imaging system may then have image segmentation applied to it via use of an interactive algorithm by a user (e.g., a radiologist). A block diagram of an example algorithm for real-time image segmentation which may be applied to received 3D medical image data is provided in FIG. 3. The user input may come from use of the regularization brush, as applied to the medical image data. An example method for updating the image segmentation based on the user input from the regularization brush is provided in FIG. 4. As described above, the updating of the segmentation mask based on user application of the regularization brush may, in some examples, involve use of a machine learning algorithm for calculation of the probability map indicating the likelihood that the new segmentation generated is the desired segmentation. An example method for use of the machine learning algorithm in order to generate the probability map is given in FIG. 4. FIG. 5 shows an example machine learning algorithm for generating a probability map for a segmentation based on generated training data; FIG. 6 shows an example operation of training process of the machine learning algorithm of FIG. 5. FIG. 7 shows an example user interface for the regularization brush, while FIG. 8 shows an example application of the regularization brush to an erroneous segmentation of medical image data.

FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 (see FIG. 2) for use in imaging the subject 112 laying on a table 114. Specifically, the x-ray source 104 is configured to project the x-ray radiation beams 106 towards a detector array 108 positioned on the opposite side of the gantry 102. Although FIG. 1 depicts only a single x-ray source 104, in certain embodiments, multiple x-ray sources and detectors may be employed to project a plurality of x-ray radiation beams 106 for acquiring projection data at different energy levels corresponding to the patient. In some embodiments, the x-ray source 104 may enable dual-energy gemstone spectral imaging (GSI) by rapid peak kilovoltage (kVp) switching. In some embodiments, the x-ray detector employed is a photon-counting detector which is capable of differentiating x-ray photons of different energies. In other embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an x-ray source projects a cone-shaped x-ray radiation beam which is collimated to lie within an X-Y-Z plane of a Cartesian coordinate system and generally referred to as an "imaging plane." The x-ray radiation beam passes through an object being imaged, such as the patient or subject. The x-ray radiation beam, after being attenuated by the object, impinges upon an array of detector elements. The intensity of the attenuated x-ray radiation beam received at the detector array is dependent upon the attenuation of a radiation beam by the object. Each detector element of the array produces a separate electrical signal that is a measurement of the x-ray beam attenuation at the detector location. The attenuation measurements from all the detector elements are acquired separately to produce a transmission profile.

In some CT systems, the x-ray source and the detector array are rotated with a gantry within the imaging plane and around the object to be imaged such that an angle at which the radiation beam intersects the object constantly changes. A group of x-ray radiation attenuation measurements, e.g., projection data, from the detector array at one gantry angle is referred to as a "view." A "scan" of the object includes a set of views made at different gantry angles, or view angles, during one revolution of the x-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present invention in which data representing an image is generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray radiation beam 106 (see FIG. 2) that pass through the subject 204 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown), a mouse, and/or a touchscreen to allow the operator to specify the commands and/or scanning parameters.

Although FIG. 2 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various methods and processes (such as the method described below with reference to FIGS. 3-6) described further herein may be stored as executable instructions in non-transitory memory on a computing device (or controller) in imaging system 200. In one embodiment, computing device 216 may include the instructions in non-transitory memory, and may apply the methods described herein, at least in part, to a reconstructed image after receiving the reconstructed image from image reconstructor 230. In another embodiment, the methods and processes described herein may be distributed across image reconstructor 230 and computing device 216.

In one embodiment, the display 232 allows the operator to evaluate the imaged anatomy. The display 232 may also allow the operator to select a volume of interest (VOI) and/or request patient information, for example, via a graphical user interface (GUI) for a subsequent scan or processing.

In some embodiments, the imaging system 200 may utilize computing device 216 for segmentation of 3D medical imaging data generated by the imaging system, for use by the radiologist or physician via interaction with the display device 232 and the operator console 220. The computing device 216 may use an algorithm for employing real-time regularization of an initial segmentation of the 3D medical image data, whereby the segmentation may be updated in response to user input to a user interface (UI) regularization brush. The user may update the initial segmentation by first rendering one or more views of the medical image data, and by applying the regularization brush to the segmentation overlaid on top of the rendered medical image data. For example, the user input to the regularization brush may include a position of the regularization brush (as set by a position of e.g., a mouse of the operator console 220), a radius of a sphere of influence of the regularization brush, and an adjustment of the radius of the sphere of influence of the regularization brush. The algorithm may then calculate a probability map, based on the user input to the regularization brush and a low-pass filter applied to the segmentation. Following calculation of the probability map, the algorithm may then further apply thresholding to the probability map (e.g., voxels/pixels below a certain probability in the probability map are discarded) to output an update to the segmentation within the sphere of influence of the regularization brush, the update based on the thresholded probability map. Calculation of the probability map and the subsequent thresholding via user application of the regularization brush may allow for adaptively smoothing the segmentation in a way that is easily adjusted and interpreted by the user in real time.

In some embodiments, the low-pass filter applied to the initial segmentation may be implemented through a machine learning algorithm, in particular through a convolutional neural network (CNN). The CNN may receive as input a database of segmentation masks, such as from a hard drive, or as generated by one or more annotation tools, and may generate a collection of altered segmentation masks of based on one or more segmentation masks included in the database of segmentation masks in order to train the CNN to correctly filter out irrelevant artifacts from the collection of altered segmentation masks. The CNN may then output a smoothed probability map, based on the training and the initial segmentation.

In this way, the systems of FIGS. 1-2 enable a system for segmentation regularization of 3D medical image data, comprising: a computerized tomography (CT) system (e.g., 100 of FIG. 1) configured to generate 3D medical image data of a patient, and a user interface (UI) (e.g., 220 and 232 of FIG. 2) configured to allow a user to implement a segmentation of the 3D medical image data. The UI may include a graphical user interface (GUI) including one or more segmentation tools, a regularization brush, and a computing device (e.g., 216 of FIG. 2) communicatively coupled to the CT system and the UI, which may render one or more views of the 3D medical image data generated by the CT system. The computing device may then receive a first user input from the GUI including a radius of a sphere of influence of the regularization brush, and an adjustment of a nudge capability of the regularization brush, and a second user input from the regularization brush applied to the rendered 3D medical image data including a position of the regularization brush, and an initial segmentation of the 3D medical image data. Based on the first and second user inputs, the computing device may then extract a region of interest (ROI) from the rendered 3D medical image data, adaptively resample the rendered 3D medical image data within the ROI, calculate a probability map for the initial segmentation, apply thresholding to the probability map in order to generate a binary mask, and output an updated segmentation of the 3D medical image data based on the binary mask.

Figure 3:
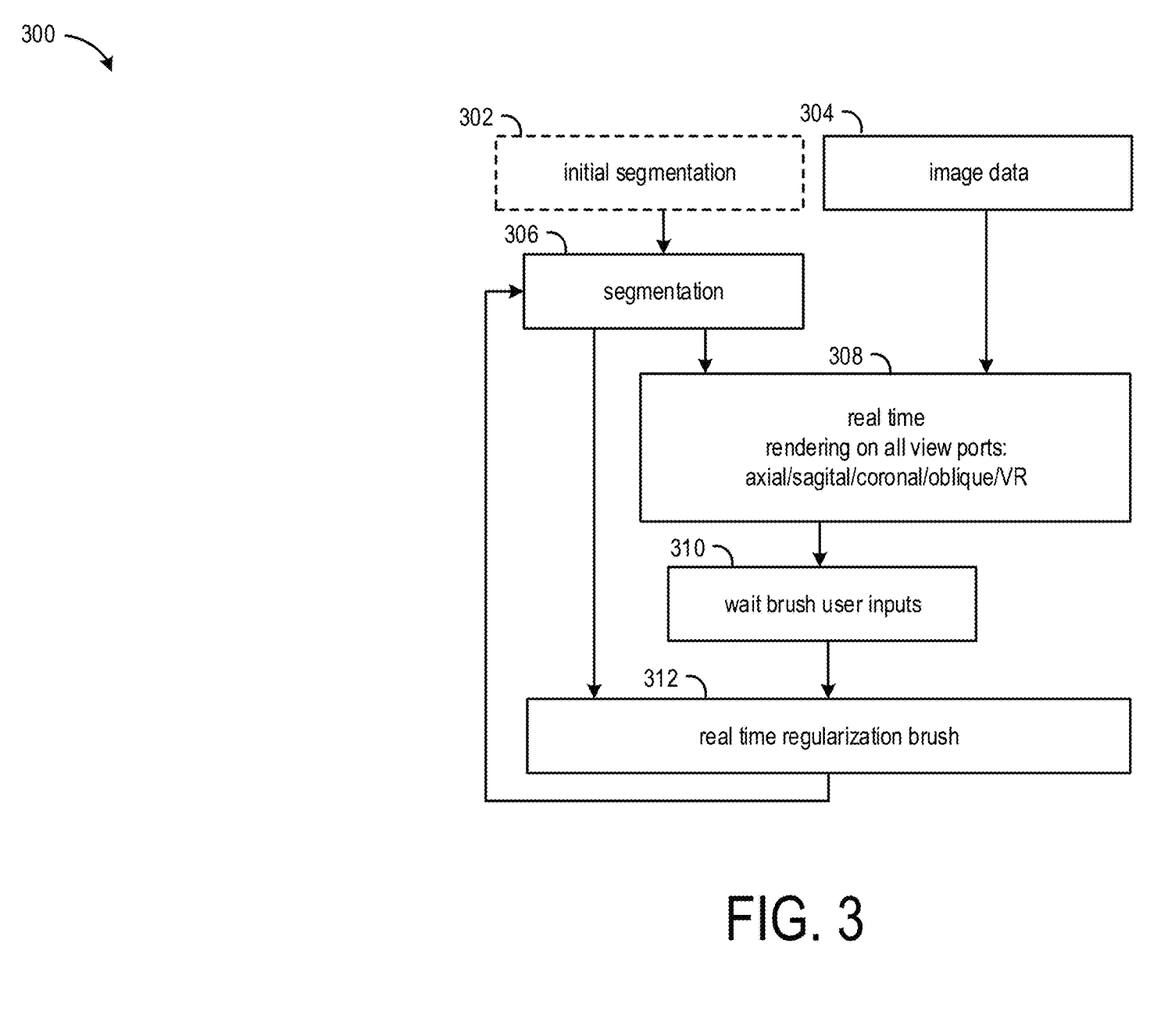
FIG. 3 shows a block diagram of an algorithm for real-time image segmentation.

FIG. 3 illustrates a block diagram for a first method 300 for real-time image segmentation. The first method 300 may take as input an initial segmentation 302 to be edited, in addition to medical image data 304. The medical image data 304 may be an image or a collection of images generated by a medical imaging device (e.g., medical images generated by the CT system 100 of FIG. 1 or the exemplary imaging system 200 of FIG. 2). The medical image data 304 may be a 3D representation (e.g., composed of voxels), or may be a collection of 2D images (e.g., image slices). At the beginning of application of the algorithm, the initial segmentation 302 may be the same as a segmentation 306 to be generated. The initial segmentation may be provided by a user (e.g., a radiologist), or may be generated from the medical image data 304 via an algorithm, e.g., an image recognition algorithm, such as a convolutional neural network (CNN) trained to identify relevant features (such as organs, blood vessels, bones, and the like) from medical image data. The segmentation 306 may then by modified according to modifications brought by a regularization brush 312, which will be described more in relation to FIG. 4.

The image data 304 and the segmentation 306 may be taken as input to make a real-time volume rendering 308 to display to the user. The real-time volume rendering 308 may include, but is not limited to, displaying a volume on the image data 304 in a given plane, with a segmentation mask as overlay (blending with a given transparency), the volume being a rendering of the segmentation mask. The real-time volume rendering 308 may be a combination of 2D/3D views for enhanced visualization of the 3D mask. For example, the volume rendering may include one or more of an axial, a sagittal, a coronal, an oblique view, the above being 2D views, and/or a volume rendering 3D view. The real-time volume rendering 308 may then await brush input 310 from the user, which may be input for the real-time regularization brush 312, in order to generate an updated segmentation mask for the segmentation 306. We note that the real-time volume rendering 308 and the regularization brush 312 are done in real-time, allowing for immediate feedback from the user for precise corrections of the segmentation 306.

Figure 4:
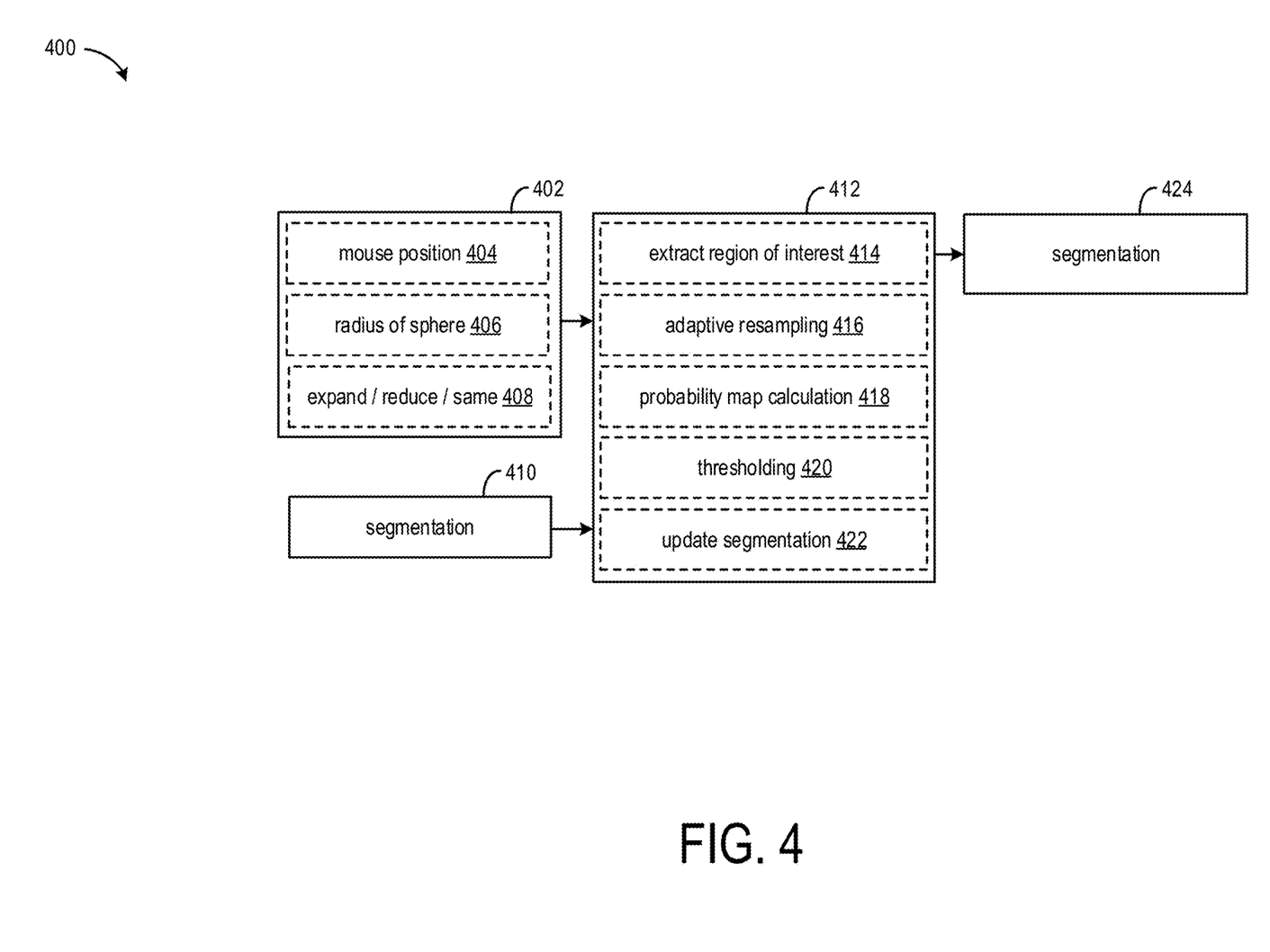
FIG. 4 shows an example method for updating an image segmentation with user input from a regularization brush.

FIG. 4 illustrates a block diagram for a second method 400 for generating output from a real-time regularization brush (such as regularization brush 312 of FIG. 1). The second method 400 will be described with relation to the systems depicted in FIGS. 1-2, but it should be understood that similar methods may be used with other systems without departing from the scope of this disclosure. The second method 400 may be carried on a controller or computing device (e.g., 200 of FIG. 2).

The second method 400 may be part of the first method 300 as described in FIG. 3; in particular, user input block 402 may have substantially similar function to the brush input 310 of FIG. 3, block 412 may have substantially similar function to the segmentation 306 of FIG. 3, segmentation 410 may have substantially similar function to the regularization brush 312 of FIG. 3, and the updated segmentation 424 may again have substantially similar function to the segmentation 306 of FIG. 3, the segmentation 306 being iteratively updated throughout operation of the first method 300 of FIG. 3. The second method 400 may include the user input block 402, the user input including user inputs desired to update a segmentation mask (such as segmentation 306 of FIG. 1) via the regularization brush. The user input block 402 may include each of a position of a mouse 404, a radius of a sphere 406 of the regularization brush, and an input 408 to either expand, reduce or maintain the same the radius of the sphere 406 of the regularization brush. The user input block 402 may be applied by the user based on a user interaction of the regularization brush (including an interactive cursor with the image of the sphere of the regularization brush) overlaid on a volume rendering (such as the real-time volume rendering 308 of FIG. 1) of medical image data (such as the image data 304 of FIG. 1). This may define a sphere where the brush will operate and how the segmentation's volume will be updated (expand, reduce or same volume). The fourth input parameter to the regularization brush is the segmentation 410, which for example may be an initial segmentation of the medical image data. The four input parameters may be fed into block 412 in order to generate the updated segmentation 424, which may be the updated version of segmentation 306 of FIG. 1.

Expanding, reducing, or maintaining the radius of the sphere 406 of the regularization brush may be linked to shortcuts in a user interface (the user interface to be explained more in relation to FIG. 5), or to different buttons on the mouse. For example, the left, middle, right button may respectively expand, regularize, and reduce the segmentation. These refinement capabilities of the radius of the sphere 406 of the regularization brush are desirable to allow correction of the segmentation in a much shorter time.

The block 412 includes may include several sequential steps. The first step 414 of block 412 includes in reducing the dimensionality of the selected section of interest of the volume rendering (e.g., the portion of the volume rendering within the sphere of the regularization brush) by removing the image data outside of the sphere of the regularization brush (also termed the region of interest (ROI)). A second step 416 of block 412 includes an adaptive resampling of the volume rendering in order to resize the ROI, to ensure that computation of the segmentation may be done in real-time, according to the computational and memory constraints of the controller.

Following the adaptive resampling of the second step 416 of block 412, the third step 418 may include computing a mask regularization to output a probability map that is more likely to be the desired segmentation, as according to the user input, such as from user input block 402. The output of the probability map calculation may be an image of the same dimension as the adaptive resampling of the volume, with a given probability per voxel (for 3D volume segmentation; the probability map calculation may alternatively be an image of the same dimension with a given probability per pixel in the 2D case), the probability taking on values between 0 and 1, inclusive. For example, a value close to 1 of a given pixel/voxel within the probability map means that the given pixel/voxel is more likely to be part of the desired segmentation. In contrast, a value close to 0 means that the given pixel/voxel may be outside the desired segmentation.

The algorithm behind the probability map calculation in the third step 418 of block 412 may be an algorithm able to apply a low pass filter on a given segmentation mask. For example, any of a mean filter, a Gaussian filter, an anisotropic filter, and other standard filters may be applied to provide the calculation of the probability map. The algorithm may also use more complex methods for calculating the probability map, including machine learning techniques (to be described further in relation to FIG. 5), such as by use of a convolutional neural network (CNN) in order to generate a probability map based on a training data set of binary masks with faults (such as image noise, unexpected image features (e.g., tumors, lesions), and image artifacts (e.g., beam hardening).

Following the initial probability map calculation of the third step 418, block 412 may proceed to the fourth step 420, which may include introducing a threshold to the probability map. The threshold may indicate a value of probability below which pixels/voxels of the given probability map may not be included in the desired segmentation. For example, by selecting a threshold value of 0.5, the desired segmentation may be regularized without modifying its volume. However, if the user wants to make the desired segmentation larger, the selected threshold may be set to 0.3, for example. On the contrary, if the user wants to make the desired segmentation shrink, the threshold value may be set to 0.7, for example. The output of the thresholding of the fourth step 420 of block 412 may be a binary image that may be applied to the segmentation mask, where portions of the resampled segmentation that are outside of the binary image may not be included in the updated segmentation, and where portions of the resampled segmentation that are within the binary image may be included in the updated segmentation.

Following thresholding in the fourth step 420 of the block 412, the second method 400 may proceed to the fifth step 422 of updating the segmentation according to the calculated probability map of the third step 418 and the thresholding of the fourth step 420. Following updating of the segmentation in the fifth step 422, the second method 400 may output the updated segmentation 424.

FIG. 5 illustrates a third method 500 for training a machine learning model to calculate a probability map (such as probability map calculation in the third step 418 of block 412 of FIG. 4). In some examples, the third method 500 may be utilized during calculation of a probability map, as part of the third step 418 of the second method 400 of FIG. 4. The third method 500 may include a first portion 502 of offline training of the machine learning model, and a second portion 508 for online calculation of the probability map.

The first portion 502 of offline training of the third method 500 may include a large database 504 of binary segmentation masks in 3D, and a machine learning model training portion 506 based on the database. The binary segmentation masks included in the database 504 of segmentation masks may be volumes made up of voxels of value either 1 (included in the segmentation), or 0 (not included in the segmentation). For example, a machine learning model may be trained to regularize the shape of a given organ (e.g., a liver). In one example, the database 504 of segmentation masks may be of segmentations of a single type of feature, such as a liver. In other examples, the database 504 of segmentation masks may include many segmentations of many different types of features (including several different types of organs, blood vessels, ligaments, bones, and so on).

The offline training process of the first portion 502 of the third method 500 may then use a database 504 of segmentation masks for that organ so that the algorithm can learn its shape within the training portion 506. During the training portion 506, simulated alterations of the database 504 of segmentation masks may be used to train the third method 500 to produce accurate probability maps, even with the presence of image artifacts. For example, the training portion 506 may include applying several modifications of sample segmentation masks within the database 504 of segmentation masks in order to train the machine learning model to filter out correctly irrelevant artifacts from segmentation mask data. For example, the modifications of segmentation masks of the database 504 of segmentation masks during the training portion 506 may include adding noise (add or remove isolated pixel/voxel from a mask), generating holes within segmentation masks (e.g., to train the machine learning model to fill the holes), generating undulations in boundaries of segmentation masks (e.g., to train the machine learning model to correct such undulations), adding/removing straight lines from segmentation masks (e.g., to simulate a beam hardening artefact), adding repetitive patterns (e.g., to simulate highly textural images), in addition to other modifications in order to produce more accurate performance of the machine learning model.

The second portion 508 of the algorithm may then apply the inferences made from the trained machine learning model in step 510 to a segmentation (such as segmentation 306 of FIG. 3 and segmentation 410 of FIG. 4), in order to generate the probability map. The probability map may be a smoothed volume composed of voxels (in the 3D case) or pixels (in the 2D case), where each pixel/voxel may take on a value between 0 (not likely to be included in the segmentation), and 1 (likely to be included in the segmentation), inclusive. The smoothed probability map may then be thresholded, as described previously in the fourth step 420 of FIG. 4.

FIG. 6 illustrates an example operation 600 of a machine learning model (such as the third method 500 described in relation to FIG. 5). The example operation 600 may include an input of a binary segmentation mask 602, which for example may be a binary mask of an organ to be segmented. The binary segmentation mask 602 may be taken from a database of segmentation masks provided to the algorithm (such as the database 504 of FIG. 5). Additionally, the segmentation mask 602 may be a local mask, such that the size of the binary mask is within a ROI (such as the ROI, as described in relation to the first step 414 of FIG. 4) of the algorithm. From the binary segmentation mask 602, the machine learning model may then generate possible simulated inputs 604 of the binary segmentation mask 602, in order to provide training data to increase the machine learning model's ability to generate more accurate probability maps (such as in the probability map calculation of the third step 418 of block 412 of FIG. 4). Example alterations to the binary segmentation mask 602 shown in the simulated inputs 604 of the machine learning model include addition of holes 606, boundary undulation 608, and addition/removal of straight lines 610, and additive noise 612, as common examples. A large plurality of alterations may be applied to the binary segmentation mask 602; above examples indicate a few classes of such alterations.

In addition to generating possible simulated inputs 604 of the machine learning model in order to produce more accurate performance of the machine learning model, the machine learning model may also generate an output 614 of a ground truth 616 of the binary segmentation mask 602. As shown in FIG. 6, the ground truth 616 may not be a binary mask: transition between inside from outside of the segmentation may be highly smoothed. The machine learning model may learn to mimic these transitions which gives probability maps with value around 0.5 at the boundary of the ground truth 616. By training the machine learning model offline via simulated inputs 604 of the machine learning model, the model may allow a regularization brush (such as the regularization brush as discussed in relation to FIG. 1) to be tuned to more accurately reproduce the underlying true segmentation mask of a considered object.

FIG. 7 shows an example user interface 700, including segmentation tools for image annotation. The user interface 700 may include commands for a regularization brush (such as the regularization brush discussed in relation to FIG. 3), in addition to other user inputs.

The user interface for the regularization brush may include a nudge capability 702, whereby a segmentation may be adjusted (either expanded or reduced) by applying the regularization brush to the given segmentation within a sphere of influence (such as the radius of the sphere 406 of FIG. 4) of the cursor pointer of the regularization brush. The size of the sphere may be adjusted via adjusting a position of a slider 712, which may include decreasing (by moving the slider to the left) the radius of the sphere or increasing (by moving to the right) the radius of the sphere.

The nudge capability 702 may allow for contraction of the segmentation within the sphere of the cursor pointer of the regularization brush, as indicated in icon 708, or allow for expanding the segmentation within the sphere of the cursor pointer of the regularization brush, as indicated in icon 710. Contraction and expansion of the segmentation via the regularization brush may include all of the steps described previously in FIGS. 2-6 to the ROI, as defined by the sphere.

Additionally, the segmentation may be altered in a 3D mode 706, or may be modified in a 2D 704, which may correspond to 2D slices of the segmentation taken along a given plane. Modification of the segmentation in 2D may correspond to a given slice of the medical image data (such as a slice of the 3D segmentation from an axial, a sagittal, a coronal, or an oblique view), whereas modification of the segmentation in 3D may include modifying a 3D volume of the segmentation, the segmentation viewable from 2D slices, or from a 3D view, such as a volume rendering 3D view.

FIG. 8 shows an example erroneous segmentation 800 applied to an image of a lung 802, including a regularization brush (such as the regularization brush discussed in relation to FIG. 3) applicable by a user for correcting the image segmentation. The sphere 804 of the cursor pointer of the regularization brush is shown over an erroneous segmentation of the image of the lung. After a mouse click, the regularization brush may be applied, outputting a corrected segmentation of the image of the lung.

In this way, by providing a real-time adaptive tool for image segmentation, a more accurate segmentation based on input from a user (e.g., a radiologist), which may be more interpretable by the user, may be achieved. The tool may designed to correct a given segmentation which can be derived from a file on a hard drive, from automated algorithms from other annotation tools, or from other sources. During image segmentation, certain elements may alter the image and leads to errors in the segmentation mask. Such elements may include: image noise, image artifacts, and tumors/lesions/high texture, among others. In particular, image noise may lead to noisy segmentations, holes in the segmentation or unnatural object boundaries, image artifacts, such as e.g., beam hardening, and scattering, may mislead the algorithms and generate noisy segmentations, and tumors/lesions/high texture may bring into the image some contours and texture that are difficult to segment manually with traditional edition tools.

All these elements may lead to unwanted image gradients, and/or noisy image boundaries. Such elements may even erase the separation between the object to be segmented and the surrounding image (e.g., COVID consolidations in a lung may have the same density as external tissues), thus obscuring image information to guide the annotation.

Other user interactive tools for segmentation of medical image data, such as an edge aware brush, may use analysis of the image in order to determine boundaries between features in the image. The edge aware brush may include the user input to edit the segmentation, and provide modifications to the segmentation which are sensitive to the image boundaries (e.g., the edge aware brush adjustment to the segmentation may be reluctant to cross the image boundary), as determined by the edge aware brush algorithm. However, as described above, in situations in which the image is noisy and/or the image gradients are not clear, the edge aware brush may lead to undesired adjustments to the segmentation, based on the noisy image data.

By relying on segmentation mask data, as opposed to solely relying on image data for segmentation mask updating, such as with the edge aware brush tool, such elements from the image data that may normally obfuscate updating of the segmentation mask may be avoided. Additionally, the localization of a boundary of a segmentation may be wrong, and there may be a desire to move it. By including the use of a user input from a regularization brush, the boundary of a segmentation mask may easily adjusted. The technical effect of utilizing user input from the regularization brush in order to update the segmentation mask is that updates may quickly be made to the segmentation mask in a user-interpretable manner.

The disclosure provides support for a method for real-time segmentation regularization of a medical image data, the method comprising: updating an initial segmentation of the medical image data in real-time based on a user input to a regularization brush applied to the initial segmentation of the medical image data, the user input to the regularization brush allowing modification of a volume of the initial segmentation. In a first example of the method, the user input to the regularization brush includes a position of the regularization brush on the medical image data, a radius of a sphere of the regularization brush, and an adjustment of the radius of the sphere of the regularization brush. In a second example of the method, optionally including the first example, another input to the regularization brush includes the initial segmentation of the medical image data. In a third example of the method, optionally including one or both of the first and second examples, the updating of the initial segmentation includes extracting a region of interest (ROI) of the medical image data, the ROI included within the sphere of the regularization brush. In a fourth example of the method, optionally including one or more or each of the first through third examples, the method further comprises: applying adaptive resampling of the medical image data within the ROI. In a fifth example of the method, optionally including one or more or each of the first through fourth examples, the method further comprises: calculating a probability map within the ROI, the probability map including voxels with values between 0 and 1, and wherein the probability map includes a likelihood of voxels included within the probability map as being within the updated segmentation within the ROI. In a sixth example of the method, optionally including one or more or each of the first through fifth examples, the probability map is populated by applying a low-pass filter to the initial segmentation within the ROI, the low-pass filter being one of a mean filter, a Gaussian filter, an anisotropic filter, and an output of a convolutional neural network (CNN). In a seventh example of the method, optionally including one or more or each of the first through sixth examples, the updated segmentation within the ROI is based on applying thresholding to the probability map. In an eighth example of the method, optionally including one or more or each of the first through seventh examples, the method further comprises: outputting the updated segmentation of the medical image data, the updated segmentation based on changes made to the initial segmentation within the ROI.

The disclosure also provides support for a method for real-time segmentation regularization of medical image data, the method comprising: updating an initial segmentation of the medical image data, the updating including, rendering of one or more views of the medical image data, receiving user input of a regularization brush applied to the rendered medical image data, calculating a probability map of the initial segmentation, the calculating based on the user input of the regularization brush, and a function for applying a low-pass filter to the initial segmentation, and outputting an updated segmentation of the medical image data, the updated segmentation based on the user input of the regularization brush and the calculated probability map. In a first example of the method, the user input comprises: a position of the regularization brush, a radius of a sphere of influence of the regularization brush, and an adjustment of the radius of the sphere of influence of the regularization brush. In a second example of the method, optionally including the first example, the low-pass filter applied to the initial segmentation is implemented through machine learning. In a third example of the method, optionally including one or both of the first and second examples, machine learning used in the low-pass filter is implemented via a convolutional neural network (CNN). In a fourth example of the method, optionally including one or more or each of the first through third examples, the CNN receives as input a database of segmentation masks. In a fifth example of the method, optionally including one or more or each of the first through fourth examples, the database of segmentation masks includes a collection of segmentation masks from a hard drive, or a collection of segmentation masks generated by automated functions from one or more other annotation tools. In a sixth example of the method, optionally including one or more or each of the first through fifth examples, an operation of the CNN includes: generating a collection of altered segmentation masks of one or more segmentation masks included in the database of segmentation masks, training the CNN on the collection of altered segmentation masks to correctly filter out irrelevant artifacts from the collection of altered segmentation masks, and outputting a smoothed probability map, the smoothed probability map based on the initial segmentation and the training of the CNN. In a seventh example of the method, optionally including one or more or each of the first through sixth examples, outputting the updated segmentation of the medical image data includes applying thresholding to the smoothed probability map and updating a portion of the initial segmentation within the sphere of influence of the regularization brush.

The disclosure also provides support for a system for segmentation regularization of 3D medical image data, comprising: a computerized tomography (CT) system configured to generate 3D medical image data of a patient, a user interface (UI) configured to allow a user to implement a segmentation of the 3D medical image data, the UI comprising: a graphical user interface (GUI) including one or more segmentation tools, a regularization brush, and a computing device communicatively coupled to the CT system and the UI, the computing device configured with instructions in non-transitory memory that when executed cause the computing device to: render one or more views of the 3D medical image data generated by the CT system, receive a first user input from the GUI, the first user input including a radius of a sphere of influence of the regularization brush, and an adjustment of a nudge capability of the regularization brush, receive a second user input from the regularization brush applied to the rendered 3D medical image data, the second user input including a position of the regularization brush, receive an initial segmentation of the 3D medical image data, extract a region of interest (ROI) from the rendered 3D medical image data, the ROI being the sphere of influence of the regularization brush, adaptively resample the rendered 3D medical image data within the ROI, calculate a probability map for the initial segmentation, apply thresholding to the probability map in order to generate a binary mask, and output an updated segmentation of the 3D medical image data, the updated segmentation based on the first user input and the second user input to the regularization brush, the calculated probability map, and the thresholding applied to the probability map. In a first example of the system, calculating the probability map for the initial segmentation is based on the first user input and the second user input to the regularization brush, and a function for applying a low-pass filter to the initial segmentation. In a second example of the system, optionally including the first example, the adjustment of the nudge capability of the regularization brush includes expansion of the segmentation via application of the regularization brush, and reduction of the segmentation via application of the regularization brush.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for segmentation regularization of 3D medical image data, comprising:
   a computerized tomography (CT) system configured to generate 3D medical image data of a patient;
   a user interface (UI) configured to allow a user to implement a segmentation of the 3D medical image data, the UI comprising:
      a graphical user interface (GUI) including one or more segmentation tools;
      a regularization brush; and
   a computing device communicatively coupled to the CT system and the UI, the computing device configured with instructions in non-transitory memory that when executed cause the computing device to:
   render one or more views of the 3D medical image data generated by the CT system;
   receive a first user input from the GUI, the first user input including a radius of a sphere of influence of the regularization brush, and an adjustment of a nudge capability of the regularization brush;
   receive a second user input from the regularization brush applied to the rendered 3D medical image data, the second user input including a position of the regularization brush;
   receive an initial segmentation of the 3D medical image data;
   extract a region of interest (ROI) from the rendered 3D medical image data, the ROI being the sphere of influence of the regularization brush;
   adaptively resample the rendered 3D medical image data within the ROI;
   calculate a probability map for the initial segmentation;
   apply thresholding to the probability map in order to generate a binary mask; and
   output an updated segmentation of the 3D medical image data, the updated segmentation based on the first user input and the second user input to the regularization brush, the calculated probability map, and the thresholding applied to the probability map.

2. The system of claim 1, wherein the calculating of the probability map for the initial segmentation is based on the first user input and the second user input to the regularization brush, and a function for applying a low-pass filter to the initial segmentation.

3. The system of claim 2, wherein the adjustment of the nudge capability of the regularization brush includes expansion of the segmentation via application of the regularization brush, and reduction of the segmentation via application of the regularization brush.

4. The system of claim 2, wherein the low-pass filter applied to the initial segmentation is implemented through machine learning.

5. The system of claim 4, wherein machine learning used in the low-pass filter is implemented via a convolutional neural network (CNN).

6. The system of claim 1, wherein, to apply thresholding to the probability map to generate the binary mask, the computing device is further configured with instructions that when executed cause the computing device to indicate a value of probability below which voxels of the probability map will not be included in the updated segmentation of the 3D medical image data.

7. The system of claim 5, wherein the value is between 0 and 1.

8. A method for segmentation regularization of 3D medical image data, comprising:
   a computerized tomography (CT) system configured to generate 3D medical image data of a patient;
   a user interface (UI) configured to allow a user to implement a segmentation of the 3D medical image data, the UI comprising:
      a graphical user interface (GUI) including one or more segmentation tools;
      a regularization brush; and
   a computing device communicatively coupled to the CT system and the UI, the computing device configured with instructions in non-transitory memory that when executed cause the computing device to:
   render one or more views of the 3D medical image data generated by the CT system;
   receive a first user input from the GUI, the first user input including a radius of a sphere of influence of the regularization brush, and an adjustment of a nudge capability of the regularization brush;
   receive a second user input from the regularization brush applied to the rendered 3D medical image data, the second user input including a position of the regularization brush;
   receive an initial segmentation of the 3D medical image data;
   extract a region of interest (ROI) from the rendered 3D medical image data, the ROI being the sphere of influence of the regularization brush;
   adaptively resample the rendered 3D medical image data within the ROI;
   calculate a probability map for the initial segmentation;
   apply thresholding to the probability map in order to generate a binary mask; and
   output an updated segmentation of the 3D medical image data, the updated segmentation based on the first user input and the second user input to the regularization brush, the calculated probability map, and the thresholding applied to the probability map.

9. The method of claim 8, wherein the calculating of the probability map for the initial segmentation is based on the first user input and the second user input to the regularization brush, and a function for applying a low-pass filter to the initial segmentation.

10. The method of claim 9, wherein the adjustment of the nudge capability of the regularization brush includes expansion of the segmentation via application of the regularization brush, and reduction of the segmentation via application of the regularization brush.

11. The method of claim 9, wherein the low-pass filter applied to the initial segmentation is implemented through machine learning.

12. The method of claim 11, wherein machine learning used in the low-pass filter is implemented via a convolutional neural network (CNN).

13. The method of claim 8, wherein, to apply thresholding to the probability map to generate the binary mask, the computing device is further configured with instructions that when executed cause the computing device to indicate a value of probability below which voxels of the probability map will not be included in the updated segmentation of the 3D medical image data.

14. The method of claim 12, wherein the value is between 0 and 1.

* * * * *